United States Patent
Leung et al.

(10) Patent No.: US 8,780,051 B2
(45) Date of Patent: Jul. 15, 2014

(54) ELECTRONIC DEVICE INCLUDING KEYPAD

(75) Inventors: Kwok Ching Leung, Richmond Hill (CA); Min Zhu, Waterloo (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 167 days.

(21) Appl. No.: 13/578,937

(22) PCT Filed: Jan. 25, 2011

(86) PCT No.: PCT/IB2011/000110
§ 371 (c)(1),
(2), (4) Date: Aug. 14, 2012

(87) PCT Pub. No.: WO2011/098874
PCT Pub. Date: Aug. 18, 2011

(65) Prior Publication Data
US 2012/0306762 A1    Dec. 6, 2012

Related U.S. Application Data

(60) Provisional application No. 61/304,576, filed on Feb. 15, 2010.

(51) Int. Cl.
*G06F 3/02* (2006.01)

(52) U.S. Cl.
USPC .......................................... 345/169; 345/168

(58) Field of Classification Search
None
See application file for complete search history.

(56) References Cited

U.S. PATENT DOCUMENTS

| | | | | |
|---|---|---|---|---|
| 8,000,741 B2 * | 8/2011 | Griffin et al. | ............... | 455/556.2 |
| 8,068,041 B2 * | 11/2011 | Dabov | ............................ | 341/22 |
| 2008/0074395 A1 * | 3/2008 | Rak | ................................ | 345/168 |
| 2009/0015439 A1 * | 1/2009 | Dara et al. | ....................... | 341/23 |

* cited by examiner

*Primary Examiner* — Joseph Haley
(74) *Attorney, Agent, or Firm* — Ridout & Maybee LLP (57) ABSTRACT

According to one aspect, a portable electronic device having a base portion having a keypad, and a sliding portion. The sliding portion is coupled to the base portion and slideable relative thereto between a closed position wherein the keypad is covered by the sliding portion, and an open position wherein the keypad is exposed. The keypad includes a plurality of keys, at least some of the plurality of keys having a ridge that extends upwardly from the top surface of the key. Each ridge extends between a lower edge of the key and an upper edge of the key and is curved therebetween. Each ridge is offset from a midline of each key.

12 Claims, 9 Drawing Sheets

ELECTRONIC DEVICE INCLUDING KEYPAD

FIELD

The present disclosure relates to portable electronic devices, and in particular to portable electronic devices having a sliding portion and base portion movable between an open position and a closed position, and including a keypad with keys that have a surface profile with a ridge.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), tablets and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay may be useful on such handheld devices as such handheld devices tend to be small and therefore limited in space available for user input and output devices. Further, the screen content on the touch-sensitive devices can normally be modified depending on the functions and operations being performed.

BRIEF DESCRIPTION OF THE DRAWINGS

Embodiments of the present disclosure will now be described, by way of example, with reference to the attached Figures, wherein.

DETAILED DESCRIPTION

The following describes an electronic device that includes a housing, a touch-sensitive display exposed by a front of the housing, and functional components comprising a memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

In other instances, well-known methods, procedures and components have not been described in detail so as not to obscure the embodiments described herein. Also, the description is not to be considered as limited to the scope of the example embodiments described herein.

Figure 1:
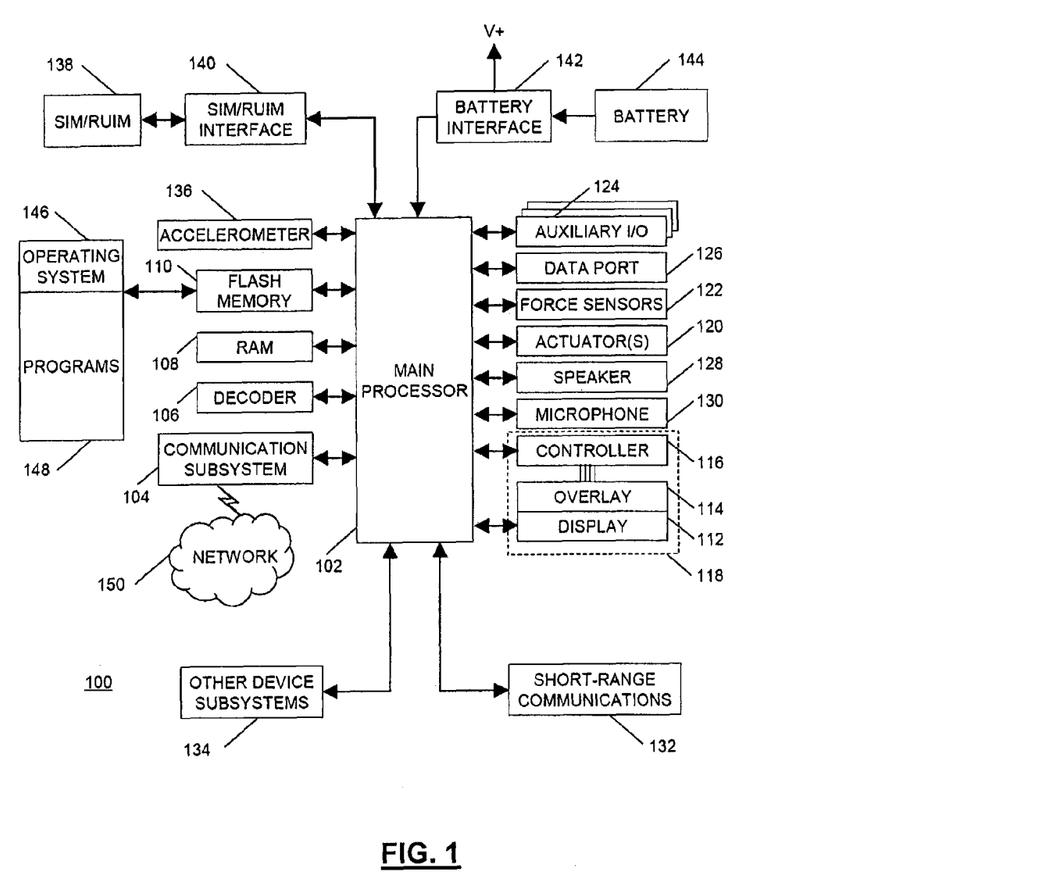
FIG. 1 is a simplified block diagram of components including internal components of a portable electronic device according to one embodiment.

FIG. 1 shows a simplified block diagram of components including internal components of a portable electronic device 100 according to some embodiments.

The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including for example data-centric wireless networks, voice-centric wireless networks, and dual-mode networks that support both voice and data communications over the same base stations.

The portable electronic device 100 may be a battery-powered device and as shown may include a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on the portable electronic device 100 may be displayed on the touch-sensitive display 118 via the processor 102.

The processor 102 may also interact with an accelerometer 136 as shown in FIG. 1. In some embodiments, the accelerometer 136 may include a cantilever beam with a proof mass and suitable deflection sensing circuitry. The accelerometer 136 may be used for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 110 or performed using other techniques.

The portable electronic device 100 also includes an operating system 146 and software components 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or other suitable device subsystems 134.

In use, a received signal such as a text message, an e-mail message, or web page download may be processed by the communication subsystem 104 and input to the processor 102. The processor 102 may then process the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing.

Turning now to FIGS. 2 to 11, illustrated generally therein is a portable electronic device 200 according to one embodiment.

The portable electronic device generally includes a sliding portion 202 (or upper housing) and a base portion 204 (or rear housing). The sliding portion 202 and lower or base portion 204 are coupled together and are slidable between a closed position (as shown in FIGS. 2 to 5 and 10, for example) and an open position (as shown in FIGS. 6 to 9 and 11 for example).

The sliding portion 202 generally includes a display 206, which could be an LCD display and which may have touch screen capabilities. In some embodiments, the display 206 could be the same as or similar to the display 118 or the display 112 as generally described above.

One or both of the sliding portion 202 and base portion 204 may include one or more input apparatus, such as navigation keys or buttons, a physical or virtual keyboard, a trackpad, a trackball, multimedia keys, etc. For example, the sliding portion 202 as shown includes an auxiliary input device 212. The auxiliary input device may be an optical navigation module (e.g. a trackpad) that responds to user interaction, and which may be used for navigating around the display screen 206, to select objects on the display screen, or for other purposes.

In some embodiments, the auxiliary input device 212 may be a mechanical device that responds to user interaction (e.g. a trackball).

As shown, the display 206 and the auxiliary input device 212 are generally disposed on a front of the sliding portion 202 and may be exposed for user accessibility regardless of whether the portable electronic device 200 is in the open or closed position.

The sliding portion 202 may also include other input devices, such as a dedicated phone application button, a dedicated "disconnect call" button, a home screen button, etc. In various embodiments, these input devices may include optical sensors, mechanical buttons, or both.

Turning now to the base portion 204, as shown the base portion 204 may include various buttons and other controls, such as buttons 208 and 210. In some embodiments, buttons 208, 210 could be used for navigation, to control volume or for other purposes. The base portion 204 could also include one or more application buttons 211 that can be used for example to launch a particular application on the portable electronic device (e.g. a camera application, a phone application, etc.). In some embodiments, the one or more buttons 211 may be configurable by a user (e.g. the user may be able to select the particular application launched by a particular button 211).

Figures 2, 3:
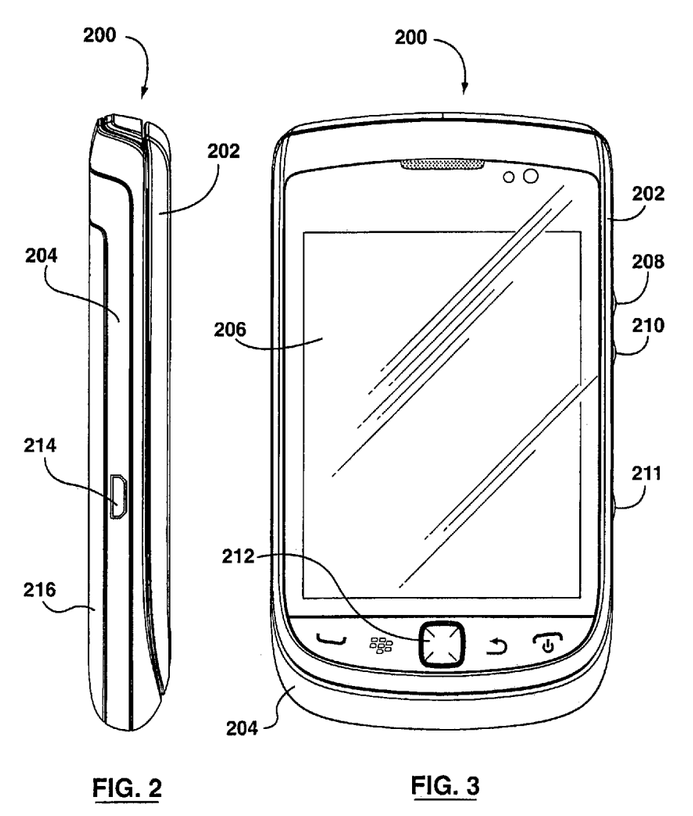
FIG. 2 is a first side view of a portable electronic device according to one embodiment shown in a closed position.
FIG. 3 is a front view of the portable electronic device of FIG. 2.
Figure 4:
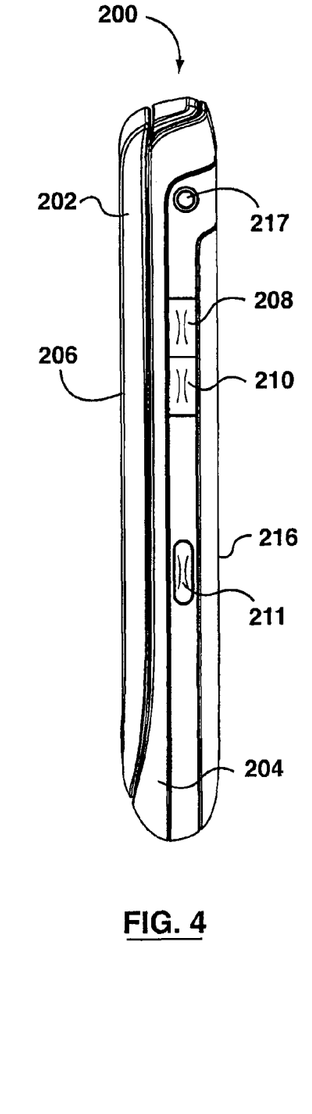
FIG. 4 is a second side view of the portable electronic device of FIG. 2.
Figure 5:
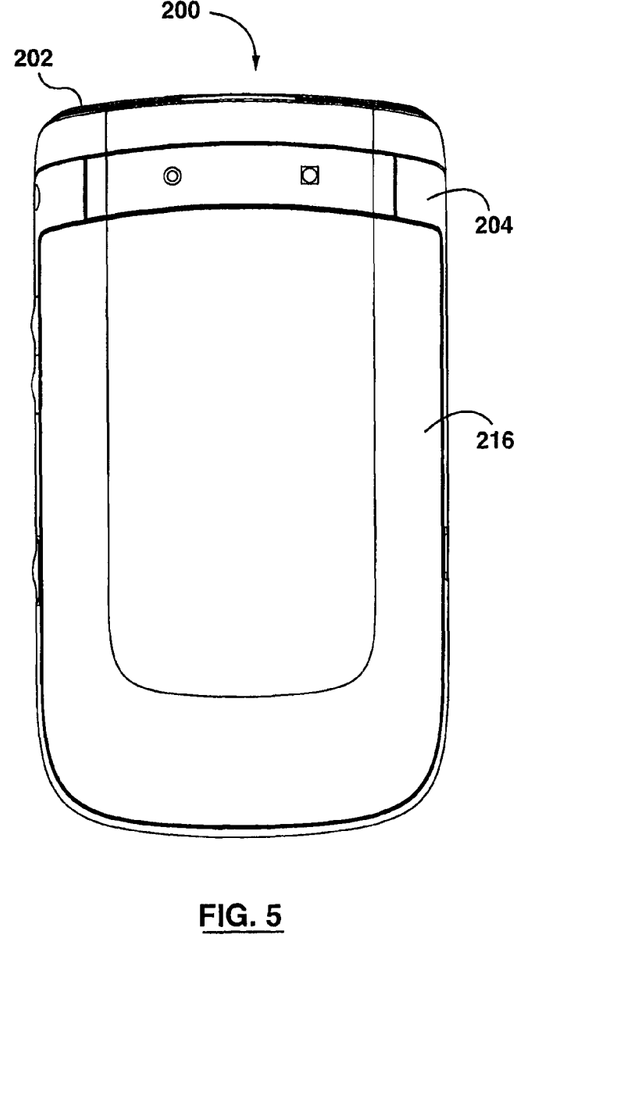
FIG. 5 is a back view of the portable electronic device of FIG. 2.
Figure 6:
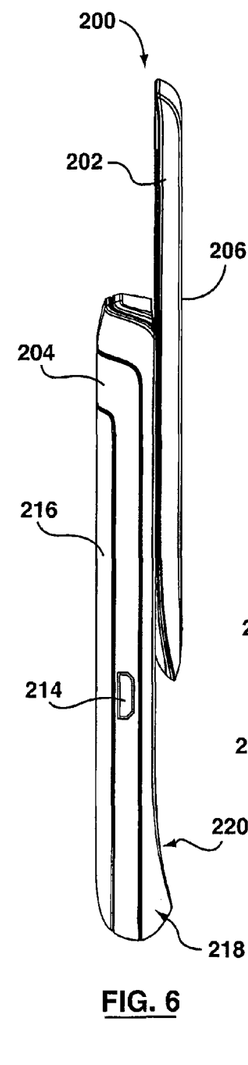
FIG. 6 is a first side view of the portable electronic device of FIG. 2 shown in an open position.
Figure 7:
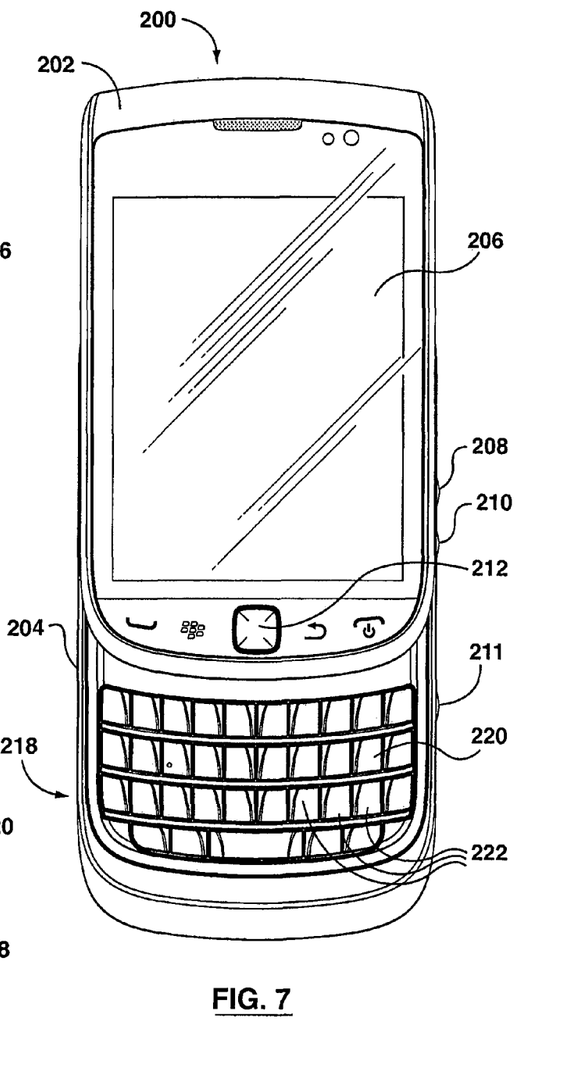
FIG. 7 is a front view of the portable electronic device of FIG. 6.
Figure 8:
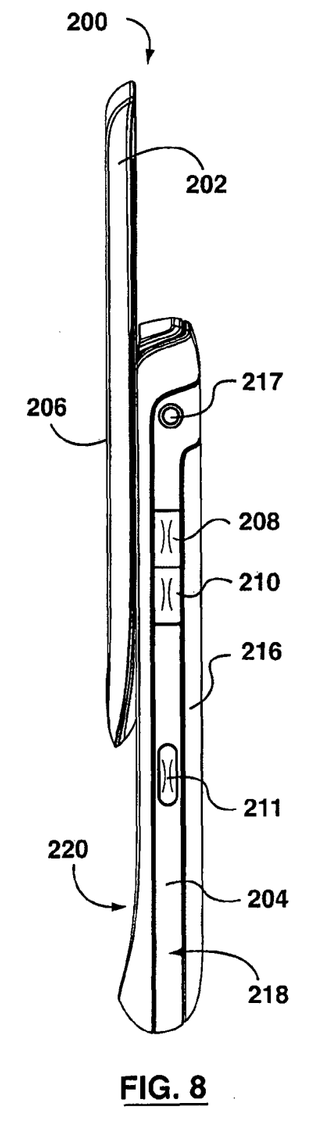
FIG. 8 is a second side view of the portable electronic device of FIG. 6.
Figure 9:
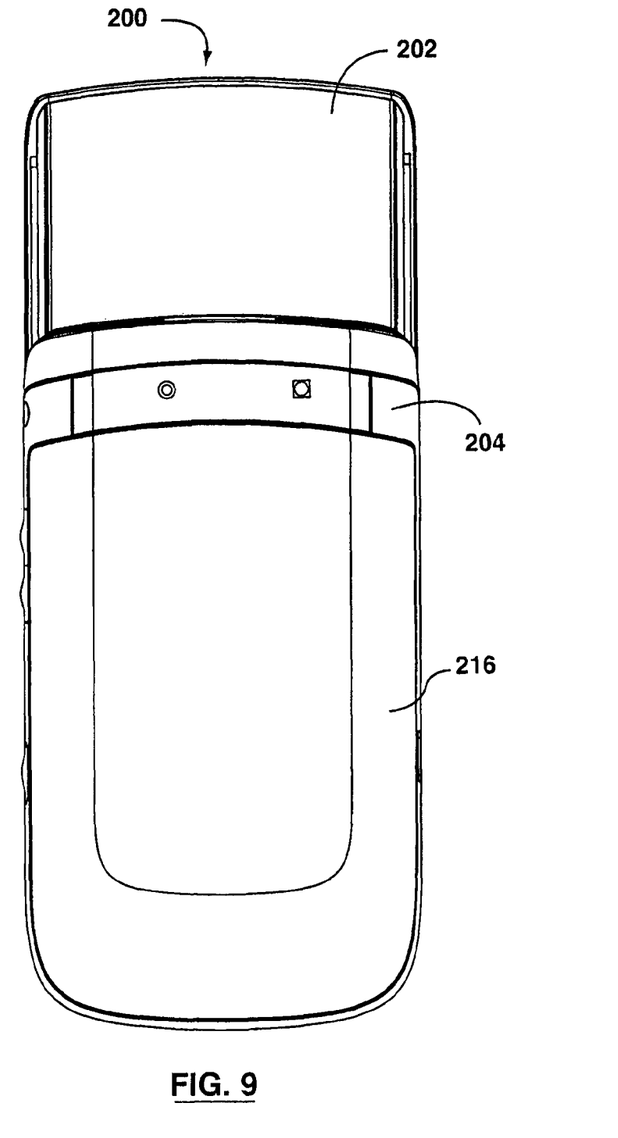
FIG. 9 is a back view of the portable electronic device of FIG. 6.
Figure 10:
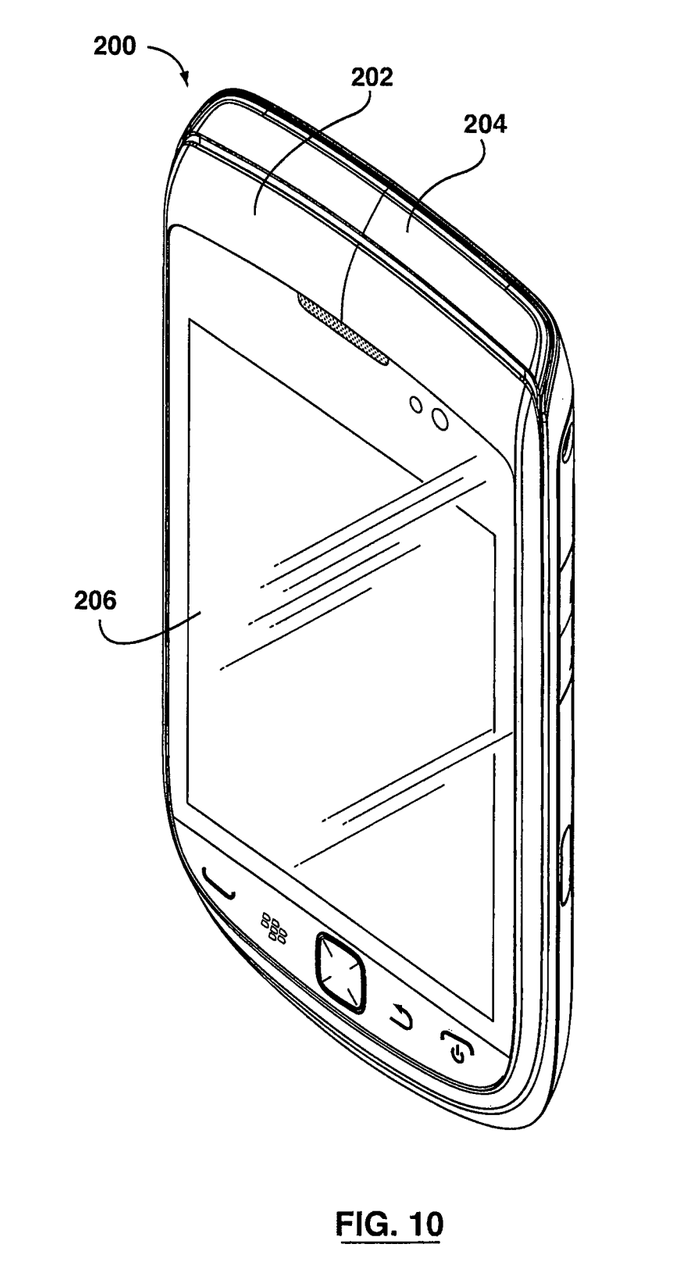
FIG. 10 is a perspective view of the portable electronic device of FIG. 2.
Figure 11:
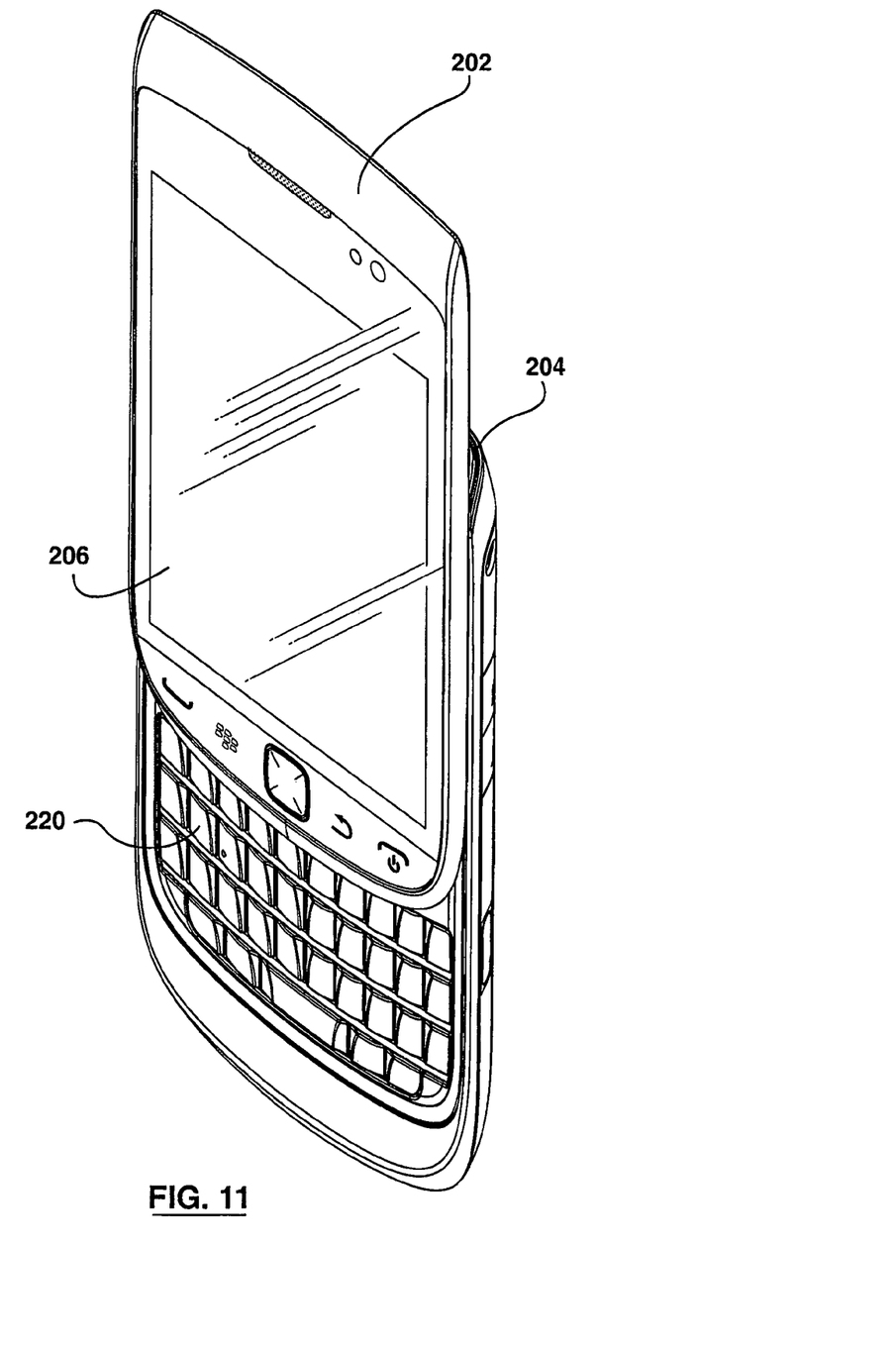
FIG. 11 is a perspective view of the portable electronic device of FIG. 6 shown in the open position.

As shown in FIGS. 2 and 6, the base portion 204 could also include one or more input or output ports, (e.g. I/O ports), such as a microUSB port 214 (and which could be similar to or the same as data port 126). In some examples, the port 214 may be used for data communication with the portable electronic device 200, for charging of a battery (which could for example be battery 144) on the device 200, or for both purposes.

As shown, the base portion 204 may also include a battery cover 216 for covering the battery (e.g. battery 144, not shown). In some embodiments, the battery cover 216 may be removable. In other embodiments, the battery cover 216 may be permanently fixed to the device.

In some embodiments, the base portion 204 may also include an audio jack 217. The audio jack 217 may be used to couple the portable electronic device 200 to a speaker, a microphone, or both, for example for use in voice communication, for listening to music on the portable electronic device 200, etc.

Turning now to FIGS. 6 to 9 and 11, as shown when the portable electronic device 200 is in the open position, a keypad 220 is exposed on a lower portion 218 of the base portion 204. The keypad 220 generally includes a plurality of alphanumeric keys 222 for inputting data into and otherwise controlling the portable electronic device 200. As shown, the keys 222 may be positioned in a plurality of rows and columns. In some embodiments, the keys 222 may represent an alphabet with the particular letters arranged with a standard keyboard layout (e.g. QWERTY, QWERTZ, DVORAK, etc.) or according to other particular patterns.

When the portable electronic device 200 is in the open position (as shown in FIGS. 6 to 9), the keypad 220 is exposed for user accessibility.

As shown in FIGS. 2 to 5, when the portable electronic device 200 is in the closed position, the keypad 220 is generally covered by the sliding portion 202. This may be beneficial as it may protect the keypad 220 when the portable electronic device 200 is not in use, and may inhibit undesired keys from being pressed when a user is carrying the portable electronic device 200 (e.g. in a user's pocket). In some embodiments (e.g. when the display 206 is a touchsceen), the user may be able to perform functions on the portable electronic device 200 when the device 200 is closed by interacting with those input devices that are accessible, for example using buttons 208, 210, 211, the auxiliary input device 212, the display screen 206 itself, etc.

In some embodiments, the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a first touch sensor layer and the Y location determined by the signal generated as a result of capacitive coupling with another touch sensor layer.

Each of the touch-sensor layers may provide a signal to a controller that represents the respective X and Y touch location values. Thus a feature such as a virtual button or other feature displayed on the touch-sensitive display may be selected by a mapping of the touch location to a feature on the touch-sensitive display.

In some embodiments, the portable electronic device 200 is generally taller than it is wide. In such embodiments, as the portable electronic device 200 moves between the open position and the closed position, the sliding portion 202 and base portion 204 move along a longitudinal axis of the portable electronic device 200.

Figure 12:
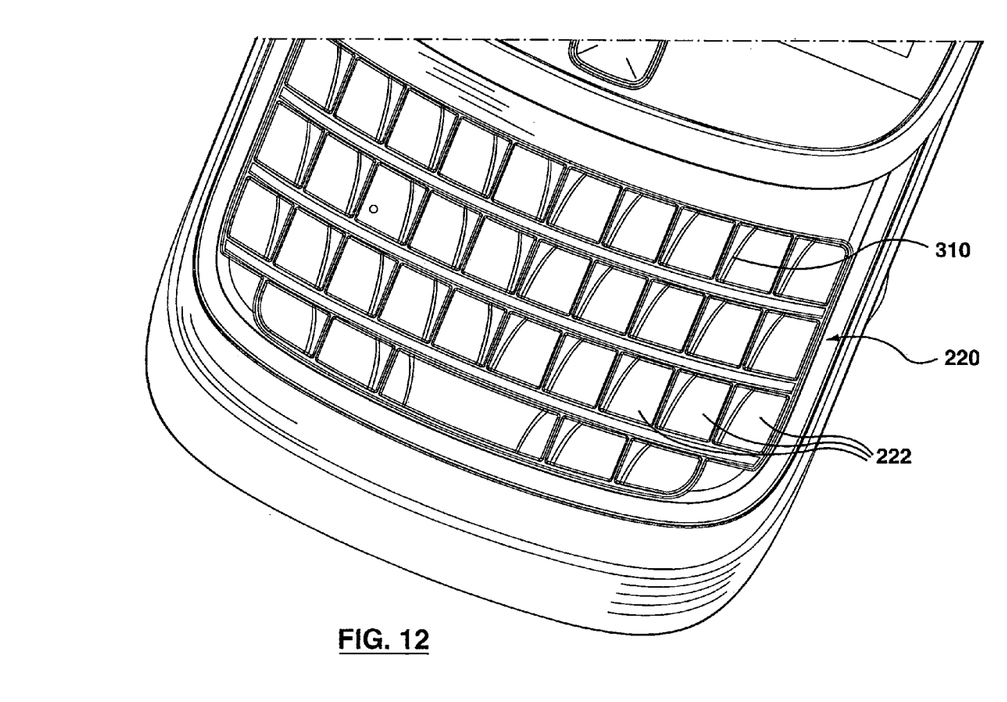
FIG. 12 is a perspective view of a portion of the portable electronic device of FIG. 6 showing the keypad with keys according to various embodiments.
Figure 13:
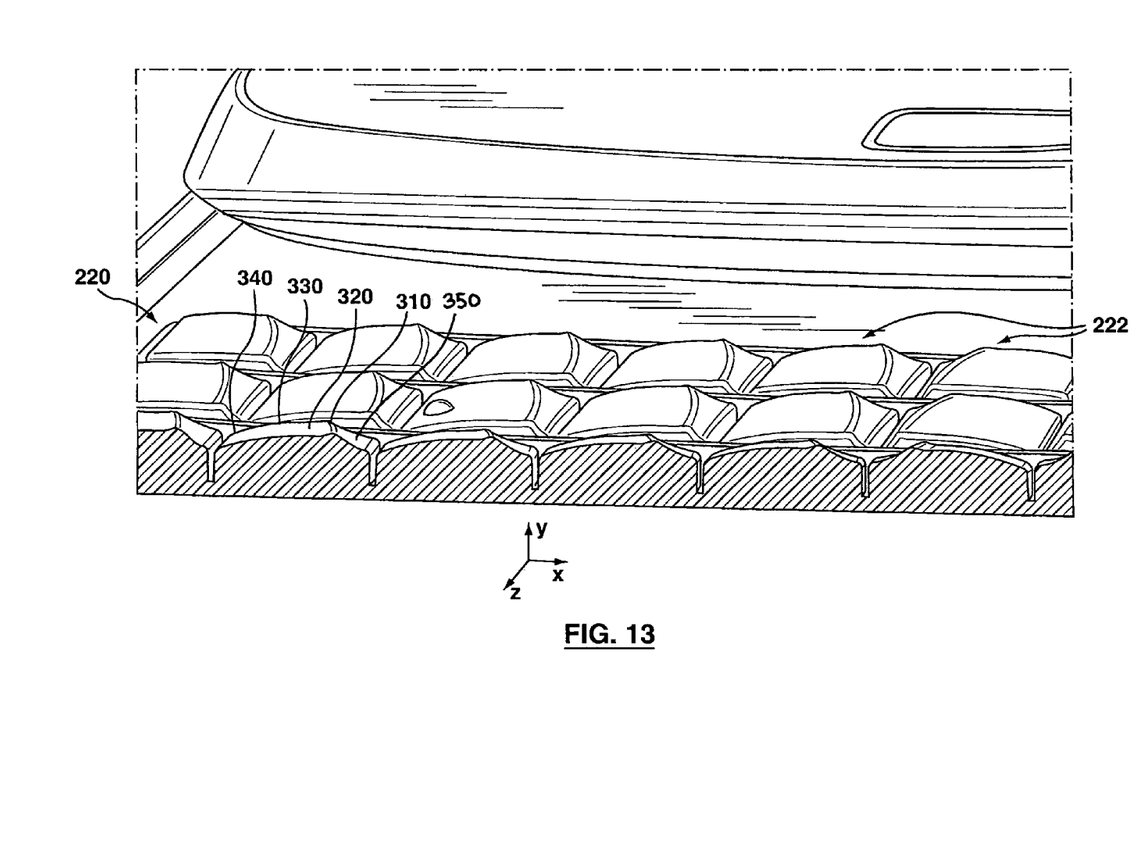
FIG. 13 is a perspective view, partly in section, of a portion of the keypad of the portable electronic device of FIG. 6.

Turning now to FIGS. 12 and 13 generally, some embodiments disclosed herein relate to the shape of the keys 222 of the keypad 220 of the portable electronic device 200. As used herein, the term "shape of the keys" generally refers to the surface profile of the keys 222, and the term "surface profile" refers to the shape or profile of a top surface of the keys 222. The term "top surface" of the key generally refers to the upper surface of the key 222 that is exposed and normally touched or actuated by a user's finger or thumb when depressing a key.

In some embodiments, the keys 222 can also be referred to as "keycaps" herein.

With some previous slider devices, certain key designs could cause interference with the sliding operation of the device as the height of the keys could interfere with the opening and closing of the sliding portion. This may be particularly problematic when a portable electronic device is designed to have a thin profile. For example, when the sliding portion is designed to be as close as possible to the base portion, the use of keys that have a tall or thick profile is undesirable.

It is also not necessarily the case that a user's finger touches the entire top surface of the key when actuating a particular key. In particular, the amount of the top surface that is actually touched normally varies depending on the shape of the top surface of the key, as well as the shape and size of the user's finger or thumb. In some cases, the amount of the top surface that is touched may depend on how high or low one or more portions of the top surface of the key are relative to other portions of the key, and how well such portions engage with or receive the user's finger or thumb.

As discussed above, the slidable portion of a portable electronic device can limit the available height of the keys, which in turn can mean that there is limited clearance distance available for the rise and fall of the touchable surface of the key. Accordingly, in such situations, a traditional key shape with a significant amount of rise and fall may not be suitable.

In some other slidable devices, in order to maintain device thinness, the keys were designed to be flush or nearly flush with their surroundings (e.g. the housing in which the keys are located) with a low "rise" and "fall" (e.g. limited amplitude changes in the surface height of the key). In such cases, it may be difficult for users of the portable electronic device to get a good "feel" or sense of the individual key locations with their fingers or thumbs. In particular, it may be difficult to distinguish one key from another. This can be problematic and may make typing using a keypad more difficult.

Furthermore, flush keys may not provide proper finger support. Proper finger support can help to prevent a user's fingers from having a significant amount of pressure overlap on other keys (which may lead to inadvertently pressing the wrong key), or on other surfaces (such as the bounding surface or housing around the keypad) when pressing the keys. In particular, the use of a key having a surface profile that is simply a shallower or flattened version of a traditional key can result in an uncomfortable or undesirable sensation.

Accordingly, one challenge to overcome is to provide a relatively thin keypad with relatively thin keys without compromising the desired tactile sensations and generally still providing good tactile key recognition.

In general, keys of the portable electronic devices as described herein may have varying surface profiles to attempt to address this challenge. As shown in FIG. 13, at least some keys may have a "ridge" 310 or spine that flares up or extends upwardly from the top surface of each key.

Reference is now made specifically to FIG. 12, which illustrates a perspective view of a portion of the portable electronic device 200. In FIG. 12, the sliding portion 202 is in the open position such that keypad 220 with the plurality of keys 222 is shown (along with the top surface of the keys 222). In various embodiments, the surface profile of the top surface of each key 222 includes a ridge 310 with a relatively sharp peak.

Reference is now made to FIG. 13, which illustrates a perspective view (partly in cross-section) of the portable electronic device 200. The cross-section is taken through a row of keys 222 of keypad 220 such that the surface profiles and ridges 310 of those keys 222 are shown more clearly.

In some embodiments, each key 222 (e.g. a particular keycap 300) has a ridge 310. Each ridge 310 is normally disposed to one side of each key 222 (e.g. offset away from the midline M of the keycap 300, as shown in FIG. 12) as will be explained in further detail below.

Each ridge 310 generally curves as it extends from one end or edge of each key 222 to another edge of that key. For example, as shown each ridge 310 extends from a lower edge of the key 222 (e.g. the edge closer to the bottom portion of the portable electronic device 200) to an upper edge of each key 222 (e.g. the edge closer to the top portion of the portable electronic device 200) generally aligned with the longitudinal axis of the device 200, and each ridge 310 is curved between the two edges of the key 222.

In various embodiments, the direction or orientation of the curve of the ridges 310 can vary. For example, the direction of curvature of the ridge 310 can depend on which side of the keypad 220 the key 222 is on. In particular, as shown in FIG. 12, keys 222 on a left side 220a of the keypad 220 may curve outwardly towards the left side of the portable electronic device 200, while keys 222 on the right side 220b of the keypad 220 may curve outwardly towards the right side of the portable electronic device 200.

In some embodiments, some keys 222 (such as for example a space bar key 222a) can have two ridges 310a, 310b on more than one side of the key 222.

In some embodiments, the curve of each ridge 310 is selected such that the ridge 310 tends to follow the movement of a thumb or finger as the thumb or finger glides or otherwise moves along the key surface of a key 222. In particular, the curve of each ridge 310 may be selected to cradle an edge of a thumb or finger as it depresses the key 222. For example, in some embodiments a user may engage keys 222 on the left side 220a of the keypad 220 with the thumb from their left hand, and engage keys 222 on the right side 220b of the keypad 220 with the thumb from their right hand; the curvature of the ridges 310 can be selected accordingly so that the ridges 310 tend to provide a good tactile response for the user's left and right thumbs.

In some embodiments, a first dip 320 may be provided adjacent each ridge 310 (and at or near the midline M of each key 222). Each first dip 320 may have a slightly concave shape and be operable to assist a user's finger or thumb to engage against a particular key 222 adjacent the ridge 310 of that key.

In some embodiments, next to each dip 320 is a rise 330, which may include a convex portion. The rise 330 may assist the user's fingers and thumbs moving along the surface of each key 222 to be directed towards the dip 320.

In some embodiments, adjacent each rise 330 (and generally on the side of the key opposite the ridge 310), may be a second dip 340 that extends to the edge of the keycap 300.

In some embodiments, on the opposite side of the ridge 310 from the first dip 320, the key 222 may have a chamfered edge 350. The chamfered edge 350 serves to create space between the touchable surfaces of adjacent keys 222, and generally cooperate with the second dip 340 from an adjacent key 222 to create extra space between the two keys 222, thus providing a good tactile response that helps the user distinguish between adjacent keys 222.

The above-described shape of the keys 222 can provide a generally clear tactile feeling to a user's finger or thumb. In particular, the tactile sensations produced by the keys 222 with the surface profiles as described herein may provide a user with a good feel of key locations and may assist in distinguishing one key from another.

Furthermore, the surface profile of the keys 222 as described herein can provide good finger or thumb support such that the finger or thumb will tend not to have a lot of pressure overlap on other adjacent keys 222 or the bounding surface of keypad 220.

In particular, the ridge 310 tends to create a high or elevated surface for clear identification of key location (e.g. by a user's thumb). Furthermore, the surface provided by the first dip 320 and rise 330 is relatively flat and tends to be comfortable for a finger or thumb to press repeatedly.

In some embodiments, the shape provided by the combination of the ridge 310, the first dip 320 and the rise 330 is complementary to shape of the user's thumb or finger (or both).

In some embodiments the combination of the ridge 310, the first dip 320 and the rise 330 is ergonomic.

As discussed above, in some embodiments, the ridge 310 may be offset to a side of the key 222 (e.g. away from the midline M) of each key. This may help provide a sufficiently large and relatively flat surface on the key 222 such that a graphic can be displayed on the key 222 (e.g. one or more alphanumeric symbols). If instead the ridge 310 was provided in the middle of the key 222 (e.g. on the midline M), it would tend to break up the surface of the key 222 into two halves and the size of the graphic may be limited, or else the ridge 310 may distort the graphic.

In some embodiments, the ridge 310 may have a height that varies along its length (e.g. between the upper edge and the lower edge). In some embodiments, the ridge 310 may be highest at an end of the key 222 closest to the display 206 (e.g. the upper edge of the key 222).

In various embodiments, the two columns of keys 222 on the extreme right and left side of the device 200 (e.g. the keys 222b and 222c) may not have the second dip 340. This may be done so as to raise the surface of the key 222 as high as possible as compared to any adjacent surfaces (such as for example a wear strip 313, bounding surface or other part of the housing) that may surround the keys 222 of the keypad 220. This can be seen by inspection of the key 222b in the most negative x and z position (e.g. the upper left corner of the keypad 220) in FIG. 13 in comparison to the other keys 222 in FIG. 13.

In some embodiments, the spacebar 222a may have a lower edge 222d that faces the above-mentioned wear strip 313. In some embodiments, this edge 222d may be chamfered in order to create extra space between the spacebar key 222a and the wear strip 313. In some embodiments, keys 222 other than the spacebar 222a may have a chamfered edge.

Generally, the keys 222 can comprise any suitable material. In some embodiments, the keys 222 comprise a FIP film with a Polycarbonate (PC) or Acrylonitrile Butadiene Styrene (ABS) back fill.

Generally, the keys 222 can have any suitable height (the term "thickness" can also be used instead of height). Both these terms generally refer to a measure of a distance along a y-axis, based on the coordinate system as shown in FIG. 13.

In some embodiments, the keys 222 have a thickness of approximately 1.30 mm at their highest point (e.g. at the highest point on the ridge 310). In some embodiments, the keys 222 have a thickness of greater than 1.30 mm at their highest point. In some embodiments, the keys 222 have a thickness of less than 1.30 mm at their highest point.

The embodiments described herein, while illustrated as a slider device, can cover other devices such as, for example, devices that are not sliders and do not have touch screens (e.g. flip phones, "candybar" phones, etc.)

While the above description provides examples of one or more processes or apparatuses, it will be appreciated that other processes or apparatuses may be within the scope of the accompanying claims.

The invention claimed is:

1. A keypad for a portable electronic device comprising:
   a plurality of keys, at least some of the plurality of keys having a ridge that extends upwardly from a top surface of the key;
   wherein each ridge extends between a lower edge of the key and an upper edge of the key and is curved therebetween, and each ridge is offset from a midline of each key;
   wherein at least some of the keys have a first concave dip adjacent the ridge, the first concave dip operable to assist a finger or thumb to securely engage that particular key; and
   wherein at least some of the keys have a convex rise adjacent the first dip, a second dip adjacent each rise generally on the side of the key opposite the ridge, and a chamfered edge on the opposite side of the ridge from the first dip, each chamfered edge cooperating with the second dip from an adjacent key to create extra space between two adjacent keys and further assist in distinguishing between adjacent keys.

2. The keypad of claim 1, wherein at least some keys do not have a second dip.

3. The keypad of claim 1, wherein at least one of the ridges has a height that varies along its length.

4. The keypad of claim 1, wherein at least one key has two ridges on more than one side of the key.

5. The keypad of claim 1, wherein the keypad is provided on a base portion of the portable electronic device, the device further including a sliding portion configured for sliding relative to the base between an open configuration and a closed configuration.

6. A portable electronic device comprising:
   a keypad comprising a plurality of keys, at least some of the plurality of keys having a ridge that extends upwardly from a top surface of the key, each ridge extending between a lower edge of the key and an upper edge of the key and being curved therebetween, and each ridge being offset from a midline of each key,
   wherein at least some of the keys have a first concave dip adjacent the ridge, the first concave dip operable to assist a finger or thumb to securely engage that particular key; and
   wherein at least some of the keys have a convex rise adjacent the first dip, a second dip adjacent each rise generally on the side of the key opposite the ridge, and a chamfered edge on the opposite side of the ridge from the first dip, each chamfered edge cooperating with the second dip from an adjacent key to create extra space between two adjacent keys and further assist in distinguishing between adjacent keys.

7. The portable electronic device of claim 6, wherein at least some keys do not have the second dip.

8. The portable electronic device of claim 6, wherein at least one of the ridges has a height that varies along its length.

9. The portable electronic device of claim 6, wherein at least one key has two ridges on more than one side of the key.

10. The portable electronic device of claim 6, wherein the keys have a highest point and wherein the keys have a height of approximately 1.30 mm or greater at the highest point.

11. The portable electronic device of claim 6, wherein the keys have a highest point and wherein the keys have a height of less than 1.30 mm at the highest point.

12. The portable electronic device of claim 6, further comprising:
   a base portion having the keypad provided thereon; and
   a sliding portion coupled to the base portion and slideable relative thereto between a closed position wherein the keypad is covered by the sliding portion and an open position wherein the keypad is exposed.

* * * * *